United States Patent

Gibson

[15] 3,638,122

[45] Jan. 25, 1972

[54] HIGH-SPEED DIGITAL TRANSMISSION SYSTEM

[72] Inventor: Earl D. Gibson, Huntington Beach, Calif.

[73] Assignee: North American Rockwell Corporation

[22] Filed: Feb. 11, 1970

[21] Appl. No.: 10,332

[52] U.S. Cl. ..... 325/42, 333/18

[51] Int. Cl. ..... H04b 1/10

[58] Field of Search ..... 325/136, 38, 50, 330–332, 325/467, 49, 65, 42; 178/68–69; 333/18

[56] References Cited

UNITED STATES PATENTS

| | | | |
|---|---|---|---|
| 3,445,771 | 5/1969 | Clapham et al. | 325/42 |
| 3,444,468 | 5/1969 | Drouilhet, Jr. et al. | 325/42 |
| 3,443,229 | 5/1969 | Becker | 325/49 X |
| 3,401,342 | 9/1968 | Becker | 324/331 X |
| 3,403,340 | 9/1968 | Becker et al. | 325/65 X |

*Primary Examiner*—Maynard R. Wilbur
*Assistant Examiner*—Charles D. Miller
*Attorney*—L. Lee Humphries, H. Fredrick Hamnn and Edward Dugas

[57] ABSTRACT

The apparatus of the present invention allows for digital data communications in the presence of intersymbol interference. A transmitter means transforms bits of digital data into a modulated analog signal for transmission over a transmission channel such as a voice-grade telephone line. A receiver for receiving the transmitted signal is comprised in part of a demodulating means for demodulating the analog signal. The demodulated signal is fed to a transversal equalizer which is a time domain network comprising a multiple tapped delay line, an adjustable attenuator connected to each delay line tap, and a summer circuit for combining the attenuated outputs of all taps into a single coordinated signal. A summer means receives the coordinated output signal from the transversal equalizer. Means are provided for sampling the output signal from the summer means at the data rate to provide a binary signal proportional to the summer means' output signal. Decision means determine the polarity and/or amplitude of the binary signal and provide a second binary signal indicative thereof to a decision feedback means. The decision feedback means forms the second binary signals into a signal having weighted components which are proportional to the received signal with the most significant bit removed. This signal is fed back to the input of the summer means and is subtracted from the later received signal so as to cancel the intersymbol interference caused by recently evaluated digits while maintaining the most significant data bit as the output signal.

12 Claims, 24 Drawing Figures

INVENTOR.
EARL D. GIBSON
BY Edward Dugas
ATTORNEY

INVENTOR.
EARL D. GIBSON
BY Edward Dugas
ATTORNEY

INVENTOR.
EARL D. GIBSON
BY Edward Dugas
ATTORNEY

APPROXIMATE AMPLITUDE—FREQUENCY CHARACTERISTICS

INVENTOR.
EARL D. GIBSON
BY Edward Dugas
ATTORNEY

INVENTOR
EARL D. GIBSON
BY Edward Dugas
ATTORNEY

INVENTOR
EARL D GIBSON

BY Edward Dugas
ATTORNEY

INVENTOR.
EARL D. GIBSON

BY Edward Dugas
ATTORNEY

INVENTOR.
EARL D. GIBSON

BY Edward Dugas

ATTORNEY

INVENTOR.
EARL D. GIBSON
BY Edward Dugas
ATTORNEY

INVENTOR.
EARL D. GIBSON
BY Edward Dugas
ATTORNEY

INVENTOR.
EARL D. GIBSON

BY Edward Dugas
ATTORNEY

INVENTOR.
EARL D. GIBSON

BY Edward Dugas
ATTORNEY

INVENTOR.
EARL D. GIBSON
BY Edward Dugas
ATTORNEY

THE POSSIBLE DISCRETE SIGNAL LEVELS AND THE THRESHOLD LEVELS FOR QUATERNARY TRANSMISSION

DECISION DEVICE FOR THE CASE OF QUATERNARY TRANSMISSION

INVENTOR.
EARL D. GIBSON
BY Edward Dugas
ATTORNEY

INVENTOR
EARL D. GIBSON
BY Edward Dugas
ATTORNEY

HIGH-SPEED DIGITAL TRANSMISSION SYSTEM

BACKGROUND OF THE INVENTION

This invention relates to a system for transmitting digital data over a transmission channel and for receiving this data reliably at exceptionally high transmission rates under the combined effects of intersymbol interference, noise and other transmission disturbances. More particularly, this invention includes means for determining the value of a transmitted digit by subtracting weighted components of previously stored samples of received signals from the latter received signal to effectively subtract out all intersymbol interference caused by the previously evaluated digits summing together with the latter received digit. The decision feedback means of the system eliminates most of the system intersymbol interference, with the transversal equalizer being used to apply an optimum linear operation to the demodulated data signal samples for the purpose of combating the remaining intersymbol interference and noise. The combined use of decision feedback with a transversal equalizer permits recovery of the transmitted data under the combined effects of the intersymbol interference and noise. Delay and amplitude distortions increase the sensitivity of the data transmission to noise which, alone, leads to errors in and of itself. This is especially true when the data rate is increased towards the Nyquist rate (a rate in bauds per second, numerically equal to twice the available bandwidth in cycles per second). The rate of operation of the present system approaches the Nyquist rate. In prior practice, the Nyquist rate has barely been approached, or exceeded, except under idealized laboratory conditions. As a result, delay and amplitude distortions must be compensated for, not only to decrease error rate, but to make more efficient use of the channel when transmitting at the higher data rates in a given bandwidth. In the past, a number of techniques have been used to correct for this transmission path distortion of digital data at the lower transmission rates. For example, if the characteristics of the transmission line are known, it is possible to accomplish equalization by predistortion, that is, the signal to be transmitted itself is distorted in such a way that the additional line distortion alters the predistorted signal to produce a received signal having the desired waveshape. This particular technique is limited to those situations where the wave characteristics of the line are constant and known.

Another technique to correct for delay distortion on a transmission line involves the use of transversal equalizer. A transversal equalizer comprises a tapped delay line and a plurality of multipliers, each associated with a single tap of the delay line. The multipliers adjust the amplitude and polarity of the signal obtained from the delay line at the corresponding tap. The outputs of these multipliers then are summed to provide a transversal equalizer output. By appropriate selection of the tapped intervals and the multiplication factors associated with each of the taps, the equalizer may be used to accomplish intersymbol cancellation. Transversal equalizers alone are limited in that they cannot completely compensate for strong distortion of the signal without attenuating the signal much more than they attenuate the noise.

In U.S. Pat. application Ser. No. 643,517, filed June 5, 1967, now U.S. Pat. No. 3,524,169, entitled "Impulse Response Correction System," by Gerald K. McAuliffe and David M. Motley, assigned to North American Rockwell Corporation, the assignee of the present invention, there is described a system for adaptively using the impulse response of a transmission channel to derive therefrom a correction signal which, when combined with the signal being received, permits recovery of the transmitted data in essentially undistorted form. This is accomplished by storing previously received corrected data bits and cross-correlating these stored bits with the signal being received, thereby obtaining the impulse response of the transmission channel. The cross-correlation is achieved by digitally multiplying each of the $n$ most recently sampled received data bits by the previously received corrected signal and integrating the products over time. A correction signal is then derived by digitally multiplying the measured impulse response values by the stored data and summing the products. This correction signal is subtracted from the received signal to provide the corrected signal which is both the systems' output signal and the signal which is stored. One of the limitations of the above system is that the process of computing the transversal equalizer gain settings and the impulse response is done in analog circuitry which includes linear integrators, capacitors, etc. The system, therefore, is not very stable due to long-term aging of the circuitry and/or drift due to temperature variations.

Another system of interest is disclosed in U.S. Pat. application Ser. No. 739,555, filed June 24, 1968, now U.S. Pat. No. 3,573,624, entitled "Impulse Response Correction System" by Jon P. Hartmann and Gerald N. Yutzi, which application is assigned to North American Rockwell Corporation. That patent application determines the impulse response of a transmission channel by means of a technique based upon a numerical method for solving simultaneous linear equations. The measured impulse response is used to derive a correction signal which, when combined with the received signal, allows recovery of the transmitted data in essentially undistorted form. The simultaneous equations are solved by a method which involves the computation of a residual for each new data pulse processed by the equalizer along with an adjustment of the stored impulse response characteristics of the channel to minimize the residual. When the impulse response of the channel is correctly determined and if the previous data pulses are correct, then the residual should be zero. If the residuals are not zero, adjustment of the impulse response is accomplished by either adding or subtracting a fixed increment to or from the stored impulse response each time a data pulse is processed and a residual computed. In this manner the impulse response is adjusted to continuously track telephone channel variations during normal data transmission and without special equalization test patterns.

A patent of interest is U.S. Pat. No. 3,368,168, entitled "Adaptive Equalizer for Digital Transmission Systems Having Means to Correlate Present Error Component with Past, Present and Future Received Data Bits" by R. W. Lucky. The system of the referenced patent continuously correlates samples of the output of a transversal equalizer with the received polar data sequence to determine the polarities of the intersymbol interference components of the single-pulse impulse response of the transmission channel; and, by using these polarities, determines the direction of successive incremental adjustments of the attenuators associated with the taps of the equalizer. The intersymbol interference components of the effective impulse response of the transmission channel are estimated in the case of polar binary data transmission by sampling the analog output of the transversal equalizer at the data transmission rate, slicing the samples to detect the received data sequence, subtracting the present standardized received data symbol from the present analog output sample to determine a present error component and correlating the present error component with past, present, and future, received data bits within the range of the equalizer to obtain a series of product terms corresponding to successive sampling instance. The product terms are then averaged over a number of sampling intervals. The polarity of these average values are next determined by a slicing circuit. The attenuators at each tap of the equalizer are finally incrementally adjusted in opposition to such polarity determinations.

Another patent of interest is U.S. Pat. No. 3,414,819, entitled "Digital Adaptive Equalizer System" by R. W. Lucky. The system of that patent is directed to an adaptive transversal equalizer for multilevel digital data in which attenuators connected to equally spaced taps are incrementally adjusted according to a correlation of the polarity of each received data system with an error polarity component so as to minimize intersymbol interference. In summary, the adaptive equalization system of the referenced patent operates by digitizing the comparison of the analog received signal with the received data to obtain the polarity only of the error signal and not its actual magnitude.

SUMMARY OF THE INVENTION

In one preferred embodiment of the present invention there is provided a transmitter means for transforming a digit of digital data into a modulated analog signal for transmission over a transmission line. A receiver comprised in part of a demodulating means demodulates the received modulated analog signal. A transversal equalizer receives the demodulated signal and provides an output signal to a summer means which output signal is compensated so as to minimize interfering components and to maintain and accentuate the most significant bit of information in the output signal. The output signal from the summer means is fed to a sampler for sampling at the data rate. A decision means receives the sampled signal from the sampler and determines the polarity and/or amplitude of the signal to provide a binary signal indicative of the polarity and/or amplitude. A decision feedback means receives the binary signal and feeds the transformed signal minus the most significant bit of the signal back to the summer means for subtraction from the later provided output signal to cancel the intersymbol interference caused by the most recently evaluated digit.

It is, therefore, an object of the present invention to provide a system for correctly receiving digital data in the presence of intersymbol interference noise and other transmission channel disturbances.

It is a further object of the present invention to provide a system for correcting the distortion of digital data transmitted over a transmission path.

It is another abject of the present invention to provide a system which utilizes a transversal equalizer and decision feedback to achieve effective equalization under a wide variety of transmission channel characteristics.

It is still another object of the present invention to provide a system wherein decision feedback simultaneously removes from several signal samples all of the intersymbol interference caused by previously received digits.

Another object of the present invention is the provision of a system utilizing a transversal equalizer that applies an optimized linear operation to two or more signal samples to minimize the probability of error in the digit decision.

The aforementioned and other objects of the present invention will become more apparent and better understood when taken in conjunction with the following description and drawings, throughout which like characters indicate like parts and which drawings form a part of this application.

DESCRIPTION OF THE PREFERRED EMBODIMENTS

Figure 1:
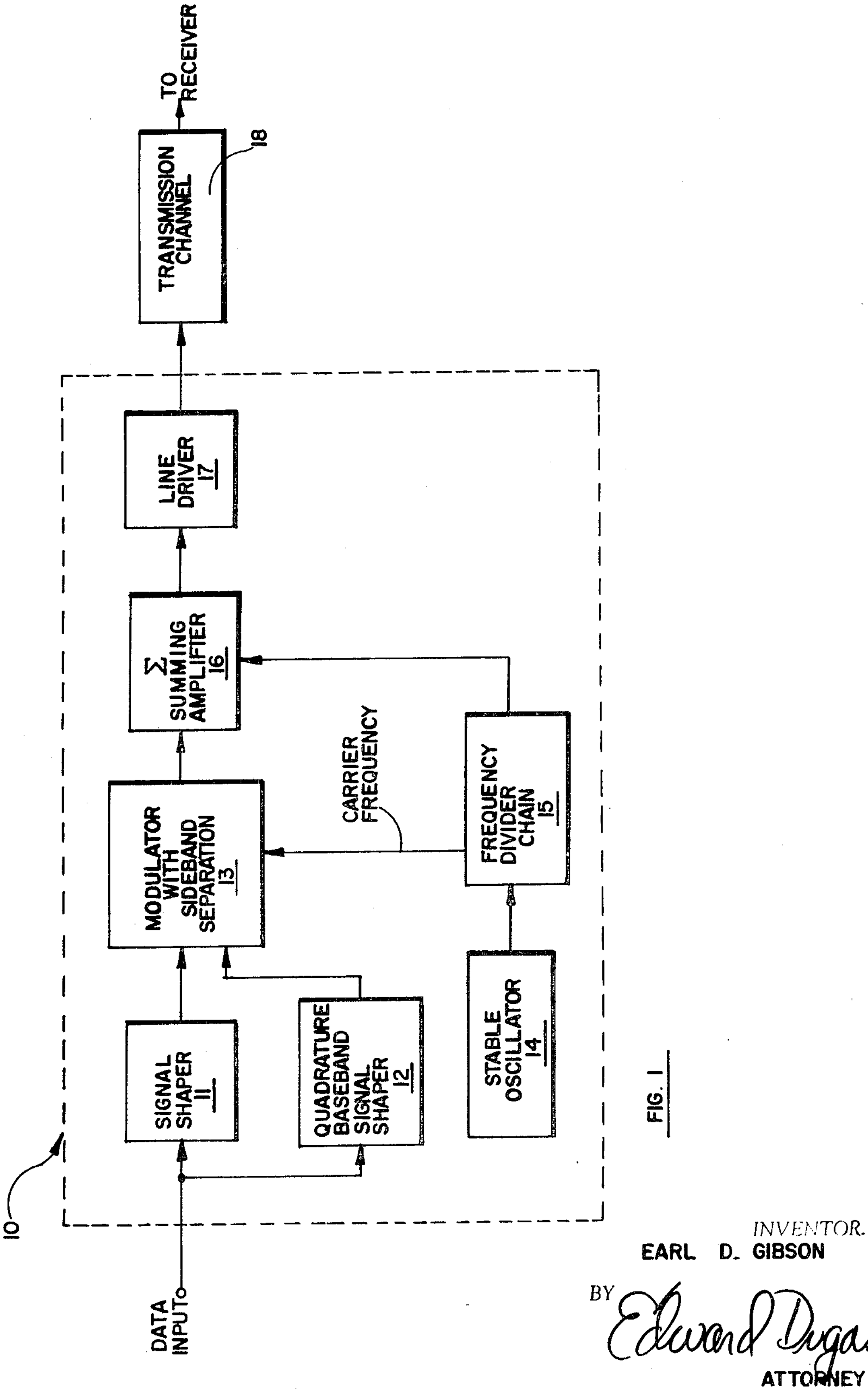
FIG. 1 is a simplified block diagram of the preferred transmitter embodiment of the present invention.

Referring now to FIG. 1 wherein is shown a general block diagram of the transmitter section 10 and a transmission channel 18. For purposes of this disclosure, the transmission channel 18 will be a telephone line, and since telephone lines are normally incapable of passing direct current information signals, systems intended for use with standard voice bandwidth telephone lines must ordinarily include some modulating process. In the present case, digital data is applied to the data input terminal at the input of a signal shaper 11 and quadrature baseband signal shaper 12.

Figure 2A:
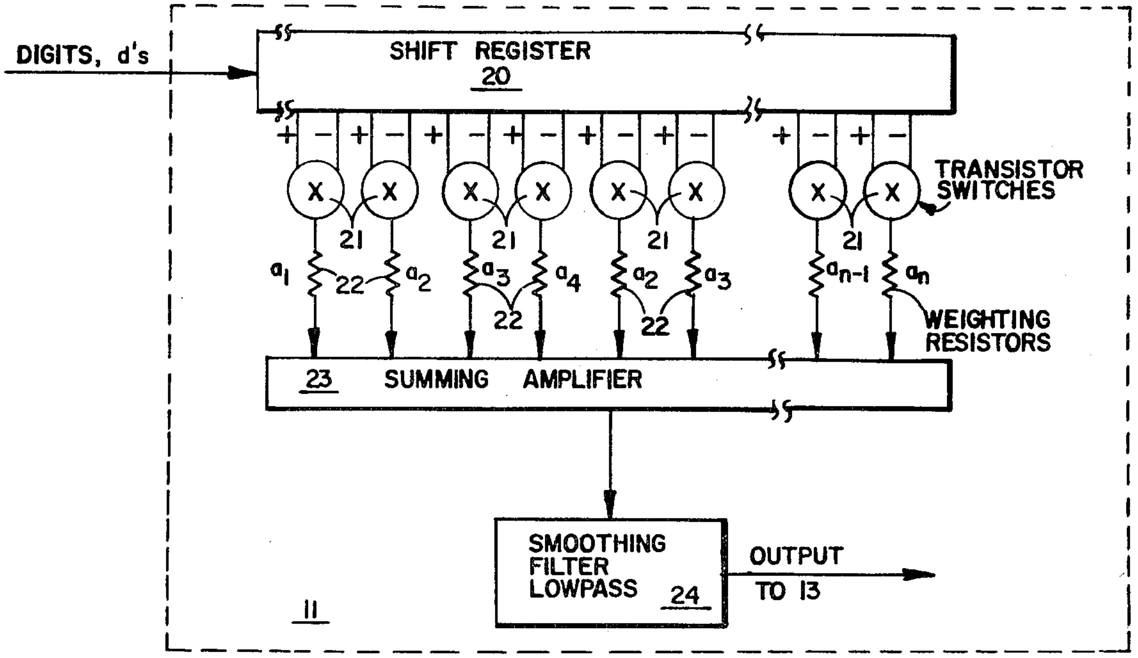
FIG. 2*a* is a more detailed block diagram of the signal sharper used in the transmitter of FIG. 1.
Figure 2B:
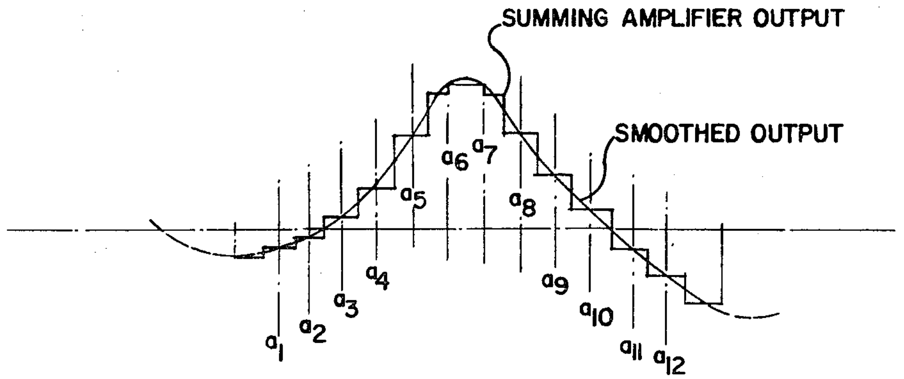
FIG. 2*b* is a waveform illustrating the pulse response of the signal sharper of FIG. 2*a;*

FIG. 2*a* is one possible embodiment of a suitable digital signal shaper 11. The preferred signal shaper 11 uses a shift register 20, the input of which is connected to the data input terminal. The shift register 20 is provided with $n$ parallel output taps where the number $n$ is determined by the precision of signal shaping required in a particular application. An $n$ number of transistor switches 21 receive the corresponding outputs from shift register 20 and feed the outputs to an $n$ number of weighting resistors 22. The digits to be transmitted pass through the shift register 20 and are given the correct sign and are multiplied by the appropriate coefficients $a_l$ to $a_n$ by means of the transistor switches 21 and the weighting resistors 22. The weighting resistor values $a_l$ to $a_n$ are so selected that the current flowing through each resistor is proportional to the amplitudes of the corresponding sample of the desired pulse (or signal digit) response at the output of the shaper, as shown in FIG. 2*b*. Each weighting resistor resistance is approximately inversely proportional to the corresponding sample amplitude of the desired signal shaper pulse response. The weighting resistors are tied to a summer amplifier 23. When a single digit passes through the shift register 20, the rectangular approximation of the desired pulse response shown in FIG. 2*b* appears at the output of the summer amplifier. The smoothing filter 24 connected to the output of the summer amplifier 23 smooths this rectangular approximation to obtain the desired smoothed output response shown in FIG. 2*b*. When it is desired to extend the pulse response in the direction of negative time, additional signal shaper stages can be added ahead of the stage associated with $a_l$ in FIG. 2*a*. In the event of multilevel signalling the simple shift register shown must be replaced by the equivalent of a multilevel shift register. The changes necessary for multilevel operation are described later in this disclosure. The values of the resistors 22 are dependent upon the particular characteristics of the transmitter, receiver and transmission channel and, therefore, have to be empirically determined for each particular use.

The main considerations involved in the synthesis of the signal shaper pulse response are:

1. Keeping the intersymbol interference small at the input of the transversal equalizer 47 in the receiver 40 (FIG. 6) so that this equalizer and the decision feedback circuit 49 (also FIG. 6) can correct the remaining intersymbol interference without excessive cost in hardware or loss in the system's signalrto-noise ratio.

2. Approximately matching the main part of the transmitted signal (which includes the most significant data bit) to the channel in order to obtain efficient transfer of the signal power and a high effective signal-to-noise ratio at the receiver. In general, the signal shaper characteristic is designed to correct the pulse (or single digit) response of the overall system (between the input of the signal shaper and the input of the transversal equalizer) with a nominal transmission channel.

The signal shaper described above is suitable for use when the transmitted baud rate exceeds approximately three times the channel bandwidth. At lower baud rates, as in nearly all applications, more than one pulse response sample per baud should be used. The sampling rate must be at least twice the channel bandwidth; and, for practical reasons, should be at least three times the channel bandwidth.

Figure 3:
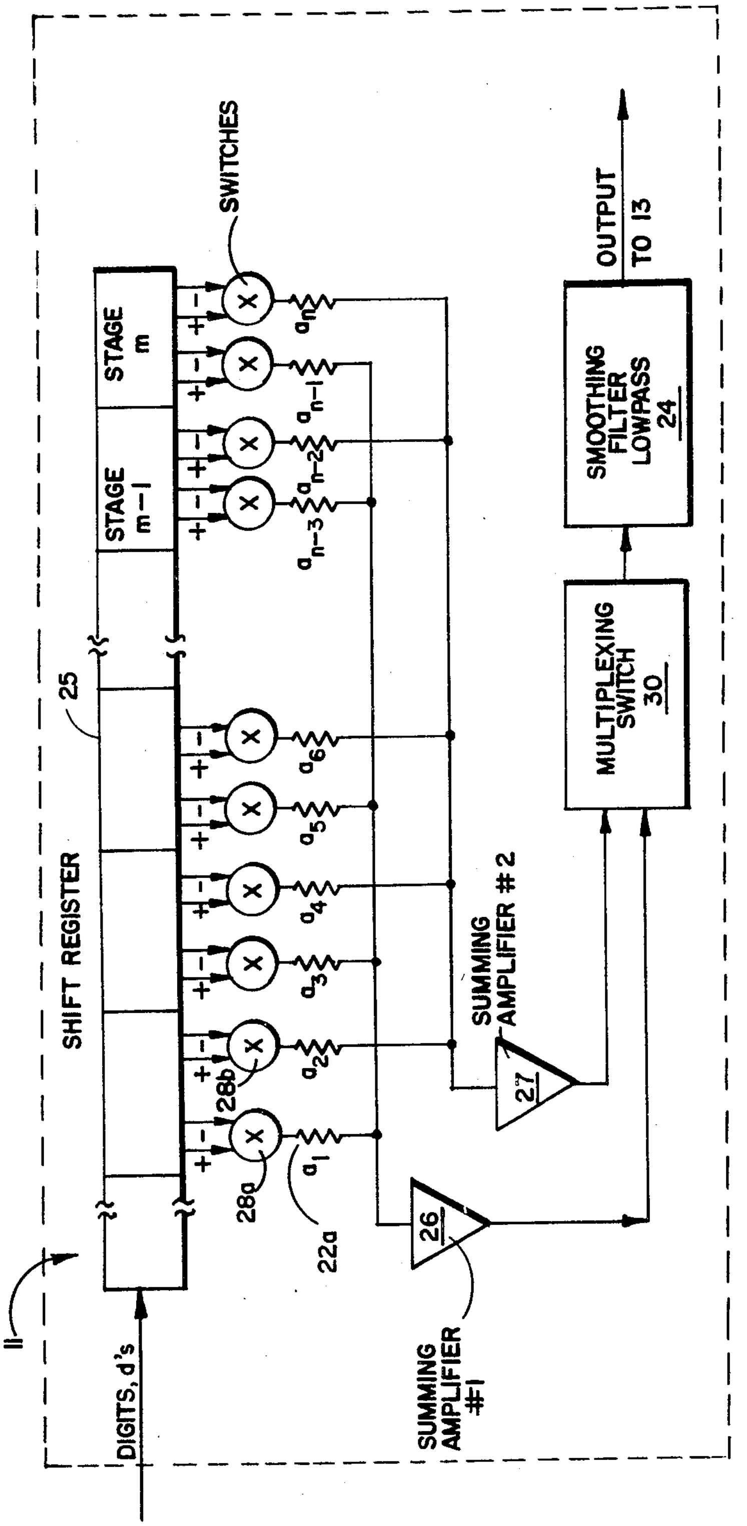
FIG. 3 is a block diagram of a signal sharper for use in the transmitter of FIG. 1 at moderate to fairly high baud rates.

FIG. 3 presents a signal shaper suitable for use at baud rates between one and one-half and three times the system bandwidth. Binary data is applied to the input of the *m*-stage shift register 25. Two transistor switches, **28*a* and 28*b*, and two weighting resistors, 22*a* and 22*b*, are connected to each stage of shift register 25. Again, the consecutive values of the weighting resistors 28 are selected such that the currents flowing through these resistors are proportional to the corresponding samples of the desired signal shaper pulse response. If the amplitudes of consecutive samples of this pulse response are $a_1$, $a_2$, $a_3$, $a_4$, etc., the values of the weighting resistor currents are set proportional to these amplitudes. Every second weighting resistor is connected to summer amplifier 26 and the intervening weighting resistors are connected to summer amplifier 27. The multiplexing switch 30 connects summer amplifier 26 to the smoothing filter 25 during the first half of each baud interval and connects summer amplifier 27 to the smoothing filter 24** during the second half of each baud interval.

Figure 4:
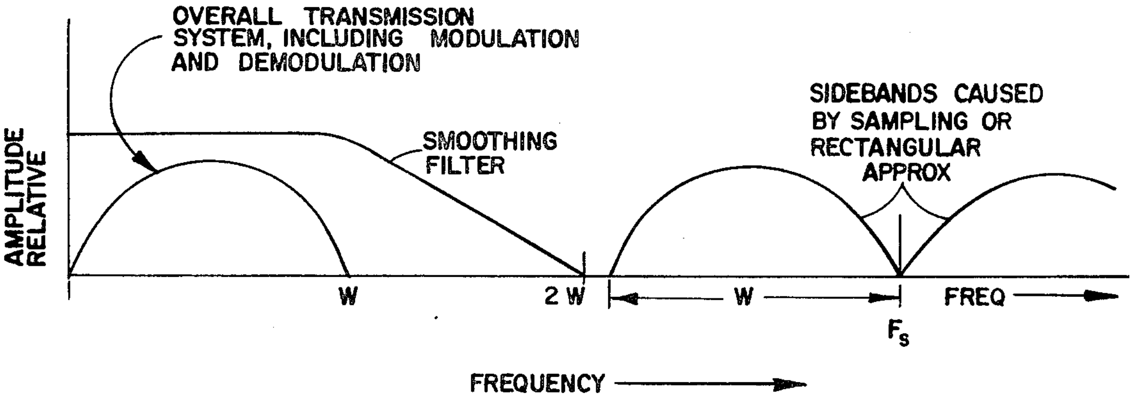
FIG. 4 is a response curve of one of the smoothing filters of FIG. 2*a;*

In both FIGS. **2*a* and FIG. 3, the smoothing filter 24 is a simple low-pass filter having the response characteristics shown in FIG. 4**. The filter amplitude-frequency characteristic is flat and the filter phase-frequency characteristic is linear over the frequency range from 0 hertz to approximately W hertz, where W is the transmission system bandwidth. The attenuation of the smoothing filter is approximately 30 db. or more at frequencies above 2W.

In the general case, the modulator 13 of FIG. 1 can be any linear (or product) type of modulator such as a double-sideband, vestigial sideband or single sideband A.M., or phase reversal type. The sidebands can be separated by filtering or by phase cancellation.

The quadrature baseband signal shaper 12 can be identical to the signal shaper 11. As in the case of the signal shaper, the quadrature baseband signal shaper has one transistor switch and one weighting resistor per shift register stage when the baud rate exceeds approximately three times the transmission system bandwidth as per FIG. **2*a*. At lower baud rates the quadrature baseband signal shaper has more than one switch and weighting resistor per shift register stage as per FIG. 3**. The number of switches and weighting resistors per stage, *n*, is such that *n*R exceeds three times the transmission system bandwidth, where R is the baud rate. The shaper of FIG. 3 is a suitable arrangement for $3W/2 \geq R \geq 3W$. On leased voice-grade telephone channels, for example, the arrangement of FIG. 3 would be suitable for baud rates between approximately 3,600 and 7,200 bauds per second.

As will be explained below, the quadrature baseband signal shaper 12 must generate the same signal as the signal shaper 11, except with each frequency component shifted by 90°. The weighting resistor values necessary to perform this function are established as follows: After the desired impulse (or pulse, or single digit) response of the signal shaper 11 has been established, obtain the frequency-domain characteristics of this response. This can be done by means of Fourier transformation. Nest, shift the phase of each frequency component by 90° and perform the inverse transformation to obtain the corresponding impulse response. The weighting resistor values are then selected so that the currents in these resistors are proportional to the amplitudes of samples of this latter impulse response. Thus, in both the signal shaper 11 and the quadrature baseband signal shaper 12, the weighting resistor currents are set proportional to amplitude samples of desired impulse responses but, in the case of the quadrature baseband signal shaper 12, the desired impulse response is calculated by shifting all of the baseband frequency components of the signal shaper impulse response by 90°.

Figure 5:
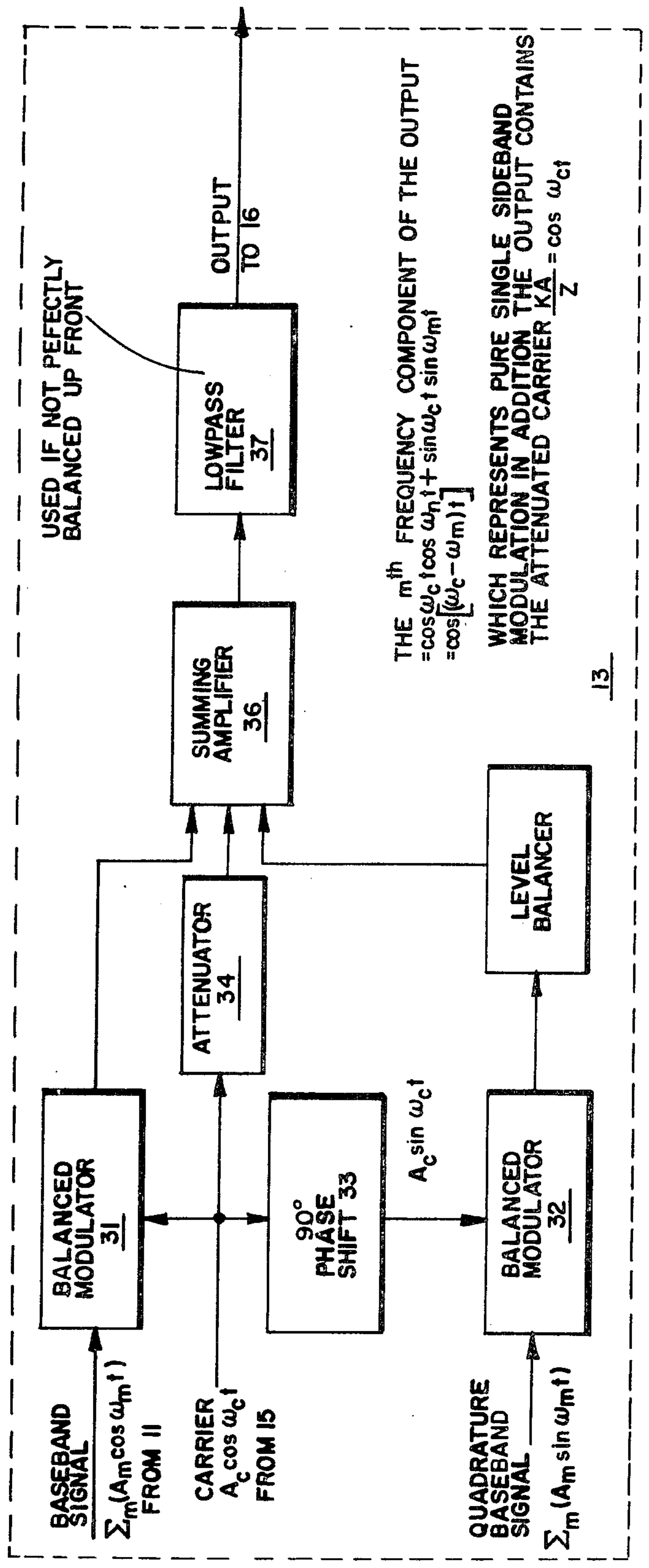
FIG. 5 is a detailed block diagram of the modulator used in the transmitter of FIG. 1.

FIG. 5 shows one modulator 13 utilizing the phase cancellation method of sideband separation. The baseband signal from the signal shaper 11 enters balanced modulator 31 and is modulated by a carrier of frequency $A_c \cos \omega_c t$ from the frequency divider chain 15. This carrier frequency is selected for the particular system application; for example, for leased voice-band telephone channels this frequency is approximately 2,800 to 3,000 hertz.

The signal from the quadrature baseband signal shaper 12 is fed to he balanced modulator 32. Modulator 32 modulates this signal by the carrier frequency shifted 90° by the 90° phase shifter 33. The output of the balanced modulator 32 is adjusted in gain by level balancer 35 and added to the output of balanced modulator 31 in the summer amplifier 36 to obtain the desired single-sideband modulated signal. The level balancer 35 adjusts the gain to keep the signal level from the two balanced modulators 31 and 32 equal so that the undesired upper sideband is eliminated in summer amplifier 36. The carrier frequency from frequency divider chain 15 is also added to this signal via attenuator 34 for use by the receiver in tracking phase jitter and frequency translation introduced by the transmission channel 18. The attenuator reduces the strength of the carrier signal to a level more compatible with the modulated signals. The level balancer 35 may be placed ahead of modulator 32 to achieve the same results.

The output from the summer amplifier 36 is fed to a low-pass filter 37. Over the frequency range from zero frequency to approximately the carrier frequency, the low-pass filter 37 has a flat amplitude and linear phase characteristics. Filter 37 then cuts off as rapidly as possible in order to further attenuate any upper sideband frequency components not completely eliminated by the phase cancellation.

The system in FIG. 5 performs the following basic mathematical operation on each frequency component of the baseband signal:

$$\text{"output"} = (A_c \cos \omega_c t)(A_m \cos \omega t) + (A_m \sin \omega_c t) A_m \sin \omega_m t$$
$$= A_c A_m \cos [(\omega_c - \omega_m)t]$$

where $A_m$ and $\omega_m$ are the amplitude and radian frequency, respectively, of the $m^{th}$ frequency component of the baseband signal; $t$ is time; and "output" is the output frequency component of FIG. 5 for the $m^{th}$ input baseband frequency component. In addition, the output of FIG. 5 contains the carrier $KA_c \cos {}_c t$, where $K$ is a selected constant determined by the attenuator 34 and $A_c$ and $\omega_c$ are the amplitude and radian frequency, respectively, of the input carrier.

This equation shows that, when this technique is precisely implemented, pure single sideband is obtained without distortion. This is a highly important operation which cannot be performed with sufficient accuracy by existing filters.

This particular arrangement for sideband separation utilizes the important advantages of the phase-cancellation method without requiring highly restrictive shapes of transmitted signals.

Returning to FIG. 1, the stable oscillator 14 provides a base frequency signal of approximately 15 to 20 megahertz to the frequency divider chain 15. The output signals from the divider chain 15 are used to obtain the carrier frequency, bit timing and sample timing signals. The circuits necessary to perform this function are well known in the prior art. The tones and timing signals needed in the transmitter and receiver which are located at one end of the transmission line can be obtained from the same stable oscillator and divider chain. It is important to choose the oscillator frequency and carrier frequency so that the latter frequency, and the necessary timing signals, can be obtained from the stable oscillator without an excessively complex frequency divider chain or other complex equipment such as modulators. The line driver 17 is an impedance matching device for matching the impedance of the transmission channel 18 to the output of the transmitter seen at the output of the summer amplifier 16. Specific devices for performing this function are also well known in the prior art.

Figure 6:
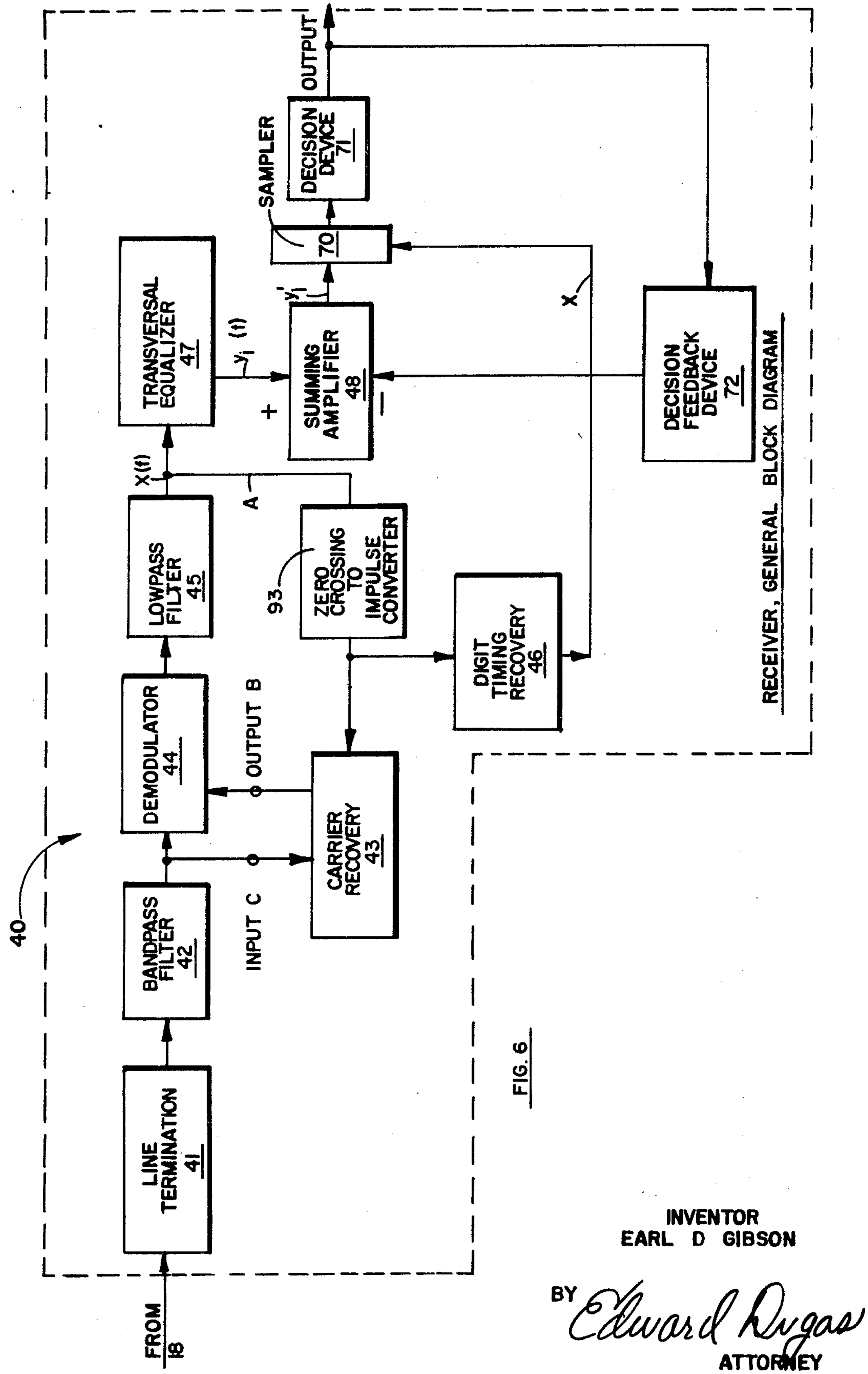
FIG. 6 illustrates in block diagram form the preferred receiver embodiment of the present invention.

FIG. 6 presents a general block diagram of the receiver 40. The signal from the transmission channel 18 first passes through a line termination device 41 which matches the impedance of the transmission line to the impedance of the receiver. Next, the signal passes through a band-pass filter 42. This is a conventional analog-type filter. This filter is designed to have approximately a linear phase-frequency characteristic and a flat amplitude-frequency characteristic across the band-pass of the transmission channel. This filter is also designed to attenuate noise frequency components outside the passband of the channel. Next, the signal passes to demodulator 44, and the carrier recovery circuit 43. The demodulator 44 can be any linear-type balanced modulator. Recalling that the carrier frequency was transmitted, a phase-locked loop in the carrier recovery 43 tracks this carrier frequency so that it can be used to drive the demodulator 44. Transmission channels often introduce undesired phase jitter and frequency translation. When the phase-locked loop tracks the received carrier accurately, the recovered carrier has the same phase jitter and frequency translation as the main signal. Therefore, when this recovered carrier is use to drive the demodulator, the phase jitter and frequency translation are removed from the demodulated signal.

Figure 7:
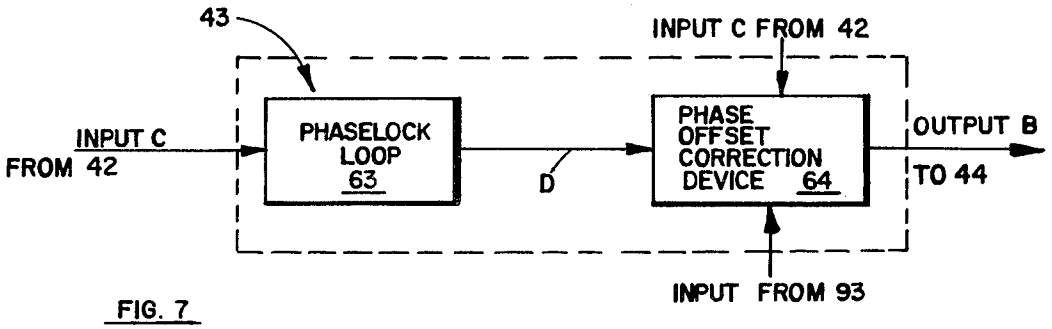
FIG. 7 illustrates in block diagram form carrier recovery portion of the receiver of FIG. 6.

Referring to FIG. 7, the two main circuit blocks of the carrier recovery 43 are the phase-locked loop 63 and the phase offset correction device 64. The purpose of the phase-locked loop 63 is to track the received carrier (or reference tone) in the presence of noise, phase jitter and frequency translation.

Figure 8:
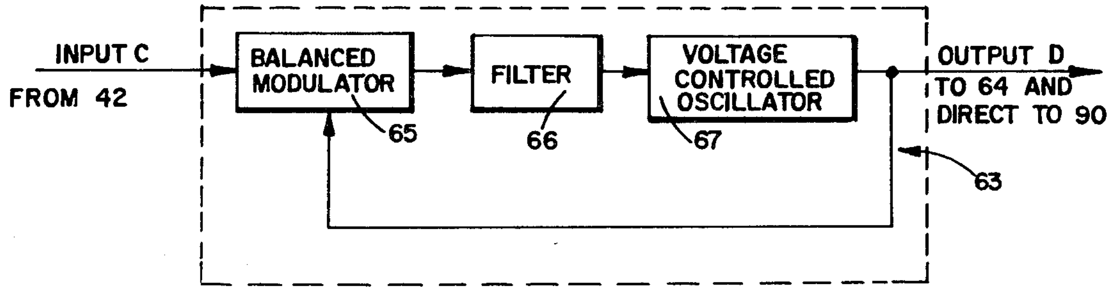
FIG. 8 illustrates in a detailed block diagram form the phase lock loop portion of the block diagram of FIG. 7.

FIG. 8 presents a block diagram of the phase-locked loop 63. A conventional balanced modulator 65 multiplies the input signal from the band-pass filter 42 by the output signal D. The multiplied output signal from the balanced modulator passes through a filter 66. The filter output signal controls the frequency of the output signal D of the voltage controlled oscillator 67. The design of filter 66 determines the characteristics of the phase-locked loop. For a particular application, the phase-locked loop characteristics should be designed to obtain the best compromise between "phase jitter" tracking capability and noise immunity. Also, the phase-locked loop bandwidth should be kept narrow enough to keep the interference from from the data signal small. A phase offset correction device 64 is needed for transmitting data at high rates over telephone channels with single-sideband modulation. The reason for this need is as follows.

In order to obtain the high data rate, that is, a rate approaching the Nyquist rate, nearly all of the channel bandwidth is needed for the data signal. Therefore, the carrier (or reference tone must be transmitted near the edge of the channel passband in order to avoid excessive interference between the data signal and the carrier. Near the edge of the band, the delay distortion is often severe, so the carrier is delayed from the bulk of the data signal. This difference in delay varies widely from channel to channel (as well as slowly on a given channel). The shape of the system pulse response depends heavily upon the carrier phase used for demodulation. Therefore, it is necessary to correct the carrier phase offset in order to obtain the general shape of pulse response needed by our type of system. Although correction of the pulse response shape can be accomplished by the equalizer, automatic correction of the carrier phase offset avoids the necessity for an excessively complex equalizer and also improves the overall modem performance.

Figure 9:
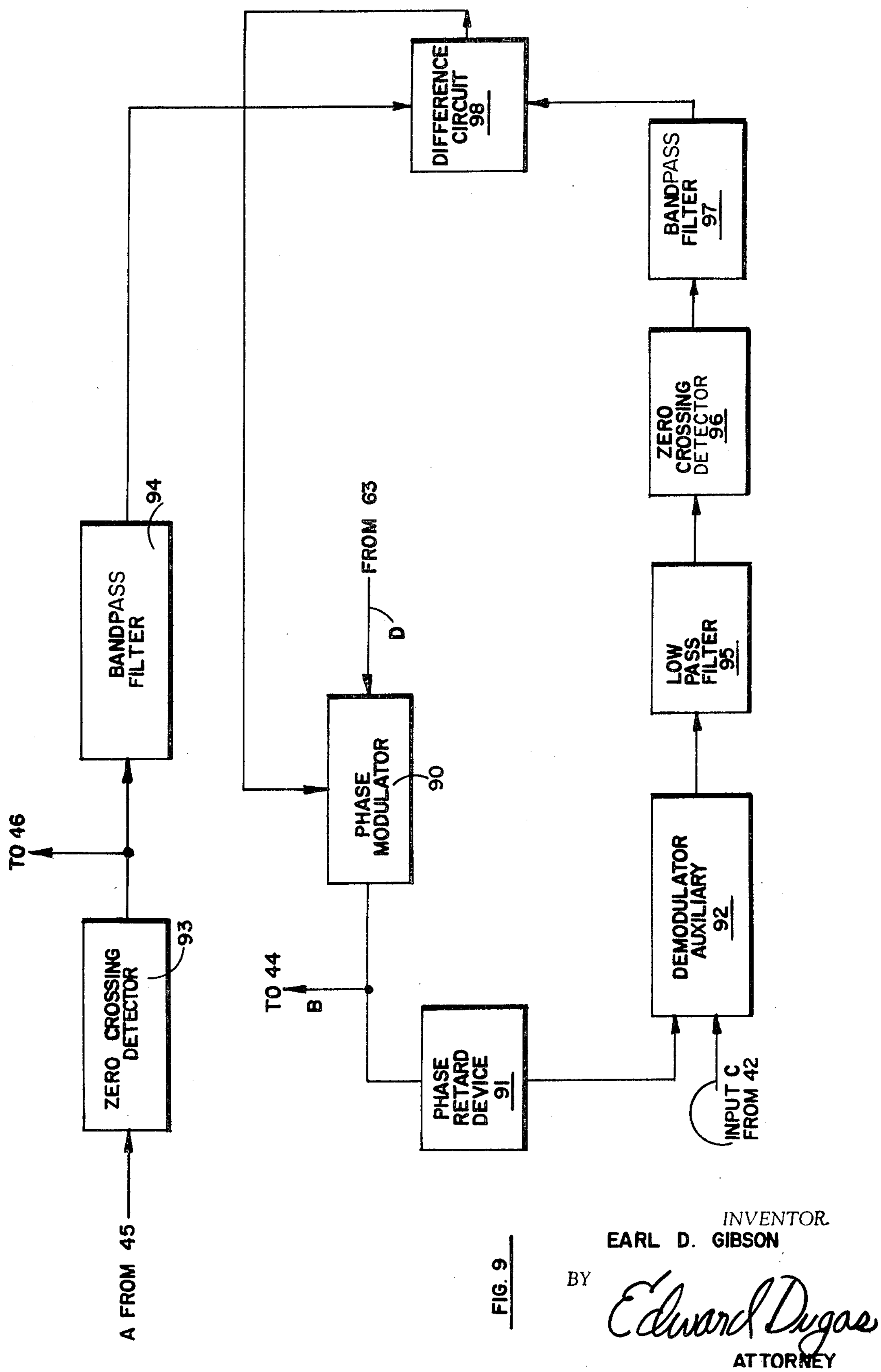
FIG. 9 illustrates in a detailed block diagram form the phase offset correction portion of the block diagram of FIG. 7.
Figure 10A:
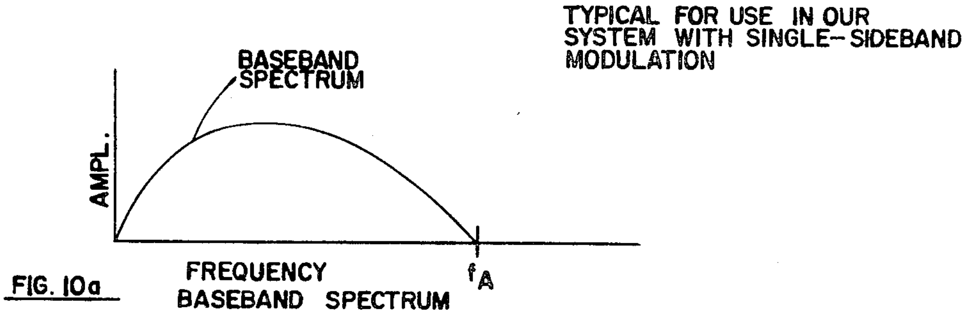
FIGS. 10*a* to 10*e* illustrates spectra useful in understanding the operation of the present invention.
Figure 10B:
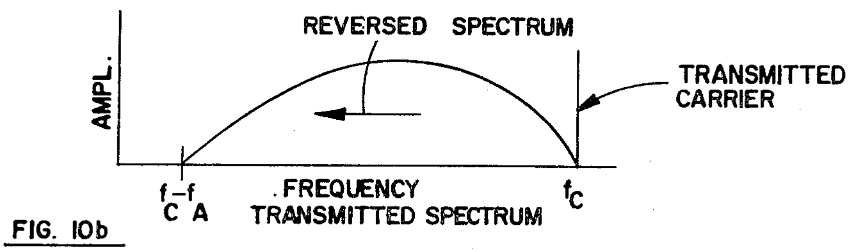
Figure 10C:
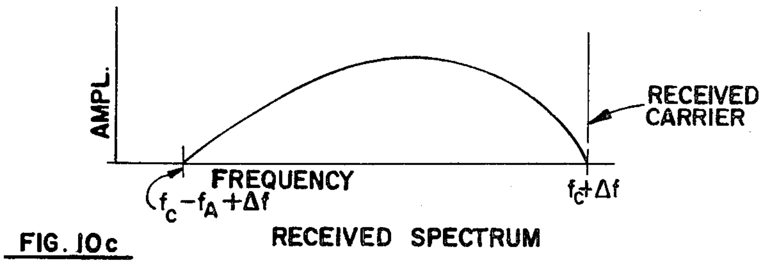
Figure 10D:
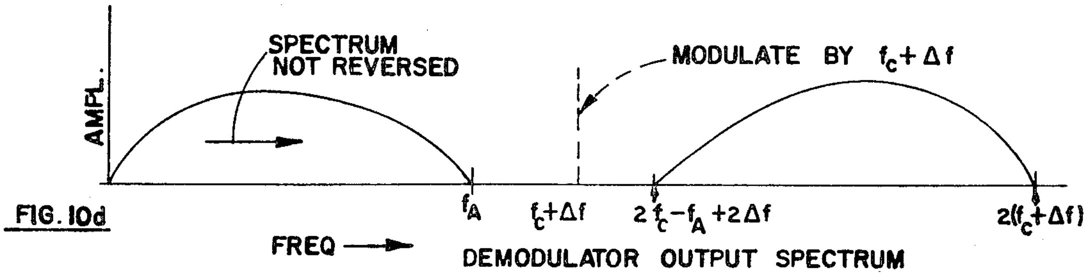
Figure 10E:
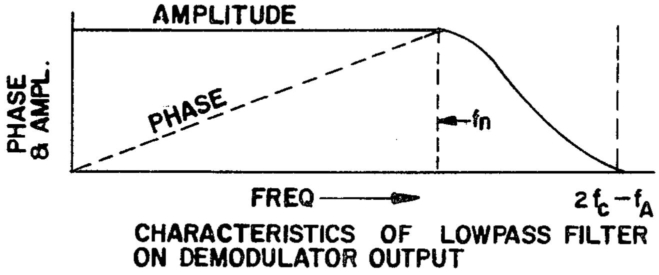

FIG. 9 presents one method of correcting the carrier phase offset. Referring to FIG. 9, in conjunction with FIG. 6, the signal C from the band-pass filter 42 of FIG. 6 enters both the main demodulator 44 and an auxiliary demodulator 92. The carrier from the phase-locked loop 63 of FIG. 7 enters a phase modulator 90 or a device capable of either advancing or retarding the carrier phase. This device shifts the phase in the direction indicated by the polarity of a voltage from the difference circuit 98. The carrier signal from the phase modulator 90 directly drives the main demodulator 44 and is also fed to the phase retard device 91. The phase retard device 91 retards the carrier phase by a small, fixed amount before it is fed to demodulator 92. Thus, the auxiliary demodulator 92 is driven by the same carrier phase used for the main demodulator with the exception that the carrier phase used for the auxiliary demodulator 92 is slightly delayed relative to the carrier phase used for the main demodulator. The outputs of demodulators 44 and 92 pass through low-pass filters 45 and 95 respectively, with characteristics suitable for separating the sidebands without substantially distorting the desired lower sideband. These two filters have identical characteristics. The lower sideband outputs of low-pass filters 45 and 95 go to zero crossing to impulse converters 93 and 96, respectively, which convert each zero crossing of the signal into an impulse, or a very narrow pulse. Each of the two resulting impulse trains is then fed into narrow band filters 94 and 97. Each of these two filters has a very narrow bandwidth centered at either the baud rate or twice the baud rate.

As the phase of the carrier driving a particular demodulator approaches the correct phase, the time spacing of the resulting demodulated, single sideband signal zero crossings and the resulting impulses tends to deviate less and less from integral multiples of the baud duration. Therefore, the closer the carrier phase is to correct, the larger the signal output from the associated narrowband filter.

The difference circuit 98 takes the difference in voltage between the outputs of the two narrowband filters 94 and 97. This difference voltage drives the phase modulator 91. The phase modulator 90 advances the carrier phase when the output of narrowband filter 94 is larger than the output of narrowband filter 97. When the reverse is true, the phase modulator 90 retards the phase. The phase of the carrier input to the main demodulator 44 is thus driven to approximately the correct value.

The operation of the system under phase jitter and frequency translation can be described as follows:

Let the $n^{th}$ transmitted frequency component be $A_n \cos\omega_n t$, where $\omega_n = \omega_c - \omega_m$ (see the last equation above), and let $\Delta\omega$ and $\Delta\theta$ be the radian frequency and phase errors, respectively, introduced by the channel. Also, let us neglect for the present the channel distortion and attenuation effects that are irrelavent to the present discussion. Then, the $n^{th}$ received frequency component becomes $A_n \cos[(\omega_n+\Delta\omega)\ t+\Delta\theta]$ The transmitted and received carriers are $KA_c\cos\omega_c t$ and $KA_c\cos\ [(\omega_c+\Delta\omega)\ t+\Delta\theta]$, respectively. After demodulation the $n^{th}$ frequency component becomes $KA_cA_n\cos[(\omega_c+\Delta\omega t+\Delta\theta]\cos[(\omega_n+\Delta\theta)\ t+\Delta\theta]$. The corresponding lower sideband then becomes $$\frac{KA_cA_n}{2}\cos\ (\omega_c-\omega_n)t$$

and $\omega_c-\omega_n$ should equal the corresponding original baseband frequency $\omega_m$. The errors $\Delta\omega$ and $\Delta\theta$ cancel out in the demodulation.

FIG. 10 illustrates the frequency spectrum shifts occuring in a typical system using this general approach. The modulator 13 in the transmitter shifts the baseband spectrum (FIG. 10*a*) upward and the lower sideband is separated to obtain the transmitted spectrum shown in FIG. 10*b*. Also, the carrier $f_c$ is transmitted. The transmission channel shifts the spectrum slightly and produces the received spectrum shown in FIG. 10*c*. The demodulator 44 output has two sidebands as illustrated in FIG. 10*d*. The low-pass filter 45 eliminates, or nearly eliminates, the upper sideband. Except for distortion, the resulting demodulated, lower-sideband spectrum is the same as the original baseband spectrum. The characteristics of low-pass filter 45, as shown in FIG. 10*e*, should have approximately a flat amplitude-frequency and linear pass-frequency characteristics across the bandwidth of the baseband signal (from zero frequency to the frequency $f_A$). This filter should have approximately 30 db. or more attenuation at all frequencies above $2f_c-f_A$.

Figure 11:
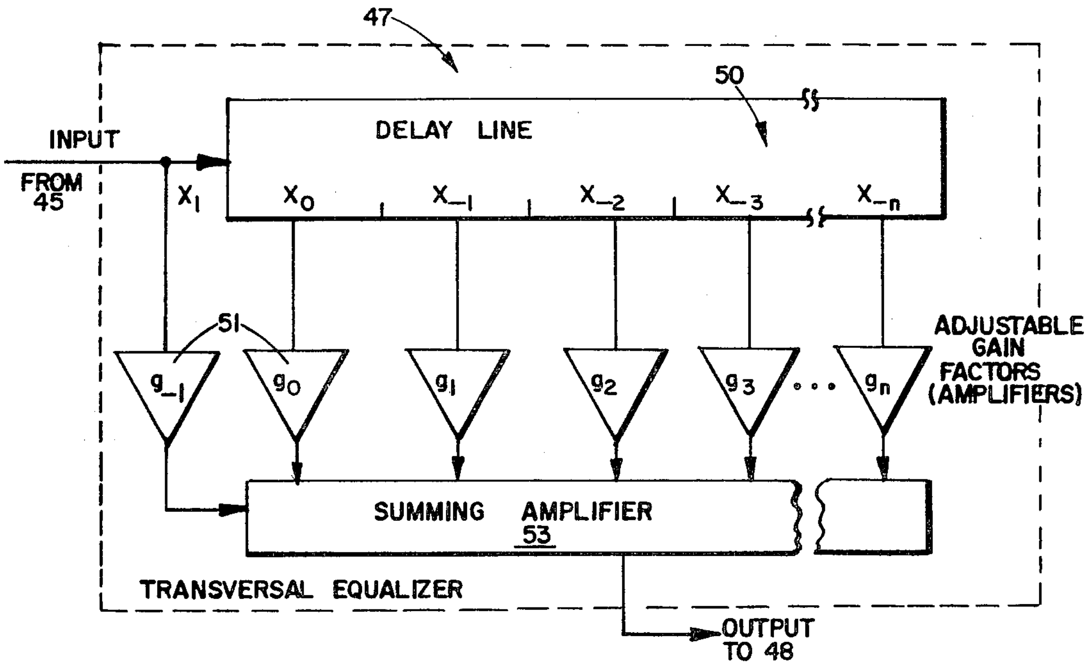
FIG. 11 illustrates in block diagram form a transversal equalizer used in the receiver of FIG. 6.

Referring next to FIG. 11 in conjunction with FIG. 6, the signal from the low-pass filter 45 enters a transversal equalizer 47. The transversal equalizer 47 is comprised of a tapped delay line 50 with the taps spaced at the baud duration. An *n*-number of tap gain amplifiers 51, designated $g_1$ to $g_n$, which can be adjusted over a range of positive and negative (or inverted) values, are connected one to each tap of delay line 50. The outputs from amplifiers 51 are fed to a summation amplifier 53. The output of the summation amplifier is fed to summer amplifier 48. Basically, the transversal equalizer performs the operation indicated by the following equation:

$$Y(t)=\ldots+g_{-1}x(t+T)+g_0x(t)+g_1x(t-T)+g_2x(t-2T)+g_3(t-3T)+\ldots$$

where $x(t)$ is the transversal equalizer input signal; $T$ is the time delay per stage of the delay line; and the $g$'s are adjustable gain factors which can be adjusted over a range of positive and negative values. In terms of signal amplitude samples taken at the baud rate, this equation becomes $$y_0=\sum_{i=-1}^{n} g_i x_i$$

as shown by FIG. 11 for the sample $y_o$ for example.

The transversal equalizer 47 can be adjusted manually by feeding the equalizer output signal to the vertical input on an oscilloscope and the digit timing signal from the digit timing recovery 46 to the horizontal input of the oscilloscope so as to form an "eye" pattern. Each gain (or attenuation) factor, *g* of amplifier 51 is adjusted to maximize the opening of the "eye." It is necessary to vary one gain adjustment at a time and obtain the largest "eye" opening possible from each adjustment. Then since the adjustments are not independent, it is necessary to sequentially adjust all of the gains a few times. The output from the summer amplifier; designated $y(t)'$ is fed to a sampler 70. Each input to the decision device 71 of FIG. 6 is an impulse from the sampler 70. The decision device 71 makes each digital decision on the basis of the amplitude of the signal sample entering the decision device. In binary signalling, the decision is based on whether or not the signal sample amplitude is positive or negative. The binary decision device can be any well-known circuit for detecting whether a signal is positive or negative. In multilevel signalling, each digit decision is based on comparing the signal sample amplitude with certain threshold levels. In that particular application the decision device is essentially a simple analog-to-digital converter. The output of the decision device is the system's output. The system's output is also fed back to a decision feedback device 72. The output of the decision feedback device 72 is then fed to the summer amplifier 48.

Figure 12:
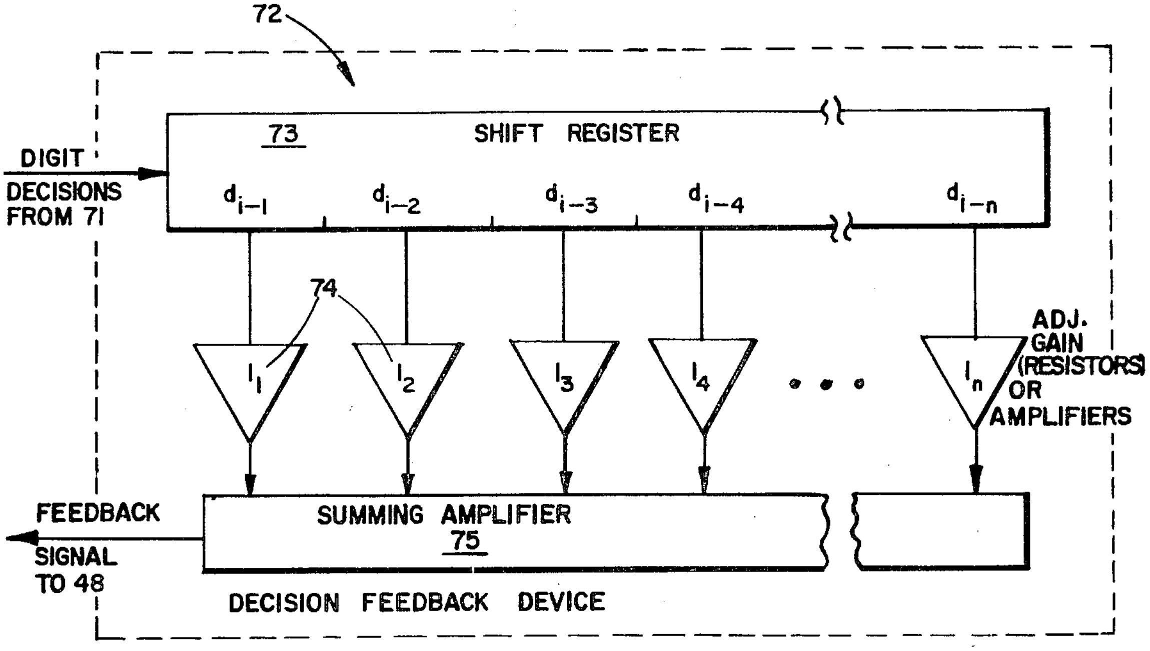
FIG. 12 illustrates in block diagram form the decision feedback device used in the receiver of FIG. 6.

FIG. 12 shows a basic version of the decision feedback circuit 72. The decision feedback circuit 72 is comprised of a shift register 73 having *n* cells, with an *n* number of adjustable gain amplifiers 74, designated $l_1$ to $l_n$, connected one to each of said cells. The outputs from amplifiers 74 are connected to the summer amplifier 75, the output of which is the feedback signal to the summer amplifier 48. The digit decisions from the decision device 71 pass through the shift register 73. In this version, the decision feedback adjustments, *l*'s, are proportional to samples of the system pulse response as it would appear at the output of the transversal equalizer 47 without the decision feedback.

The decision feedback is designed to generate a decision feedback signal of amplitude, $l_1d_{i-1}+l_2\,d_{i-2}+l_3d_{i-3}+\ldots$, at the time each digit decision $d_i$ is being made. This decision feedback signal equals the intersymbol interference caused by the transmitted digits preceding the digit, $d_i$, presently being evaluated and passing through the summer amplifier 48. The summer amplifier 48 subtracts this decision feedback signal from the signal sample $y_i$, and the output of the transversal equalizer 47, to eliminate the intersymbol interference caused by the preceding decisions, assuming there are no errors in the preceding decisions involved. The number of stages needed in the shift register 73 depends upon the number of significant pulse response samples, *l*'s, following the sample $l_o$, which in turn depends upon the baud rate, channel bandwidth and the distortion. For high performance, enough shift register stages should be used to ensure that all of the significant *l*'s following $l_o$ are included in the decision feedback signal. Stated somewhat more precisely, for high performance, the following two conditions should be met: (1) when there are a large number of very small trailing *l*'s (the *l*'s following $l_o$ are called "trailing l's") not included in the decision feedback correction, then $\Sigma'\,l_j^2$ should be less than about 0.001 $l_o^2$, where $\Sigma'$ denotes summation over these small *l*'s and (2) when a few of these trailing *l*'s not included in the decision feedback predominate; $\Sigma''|\,l_j\,|$ should be less than approximately 0.1 $l_o$ where $\Sigma''$ denotes summation over the predominating trailing *l*'s that are not included in the expression for the decision feedback correction signal amplitude. The decision feedback can also be adjusted manually by the same method described above for the transversal equalizer with the exception of adjusting the decision feedback gain factors, *l*'s, instead of the *g*'s. The summer amplifiers 48, 53 and 75 of FIGS. 6, 11 and 12 could all be combined into a single summer amplifier.

A digit timing recovery circuit 46 receives the output signal from the low-pass filter 45 and recovers the timing pulses therefrom. The recovered pulses are used to clock the sampler 70.

Figure 13:
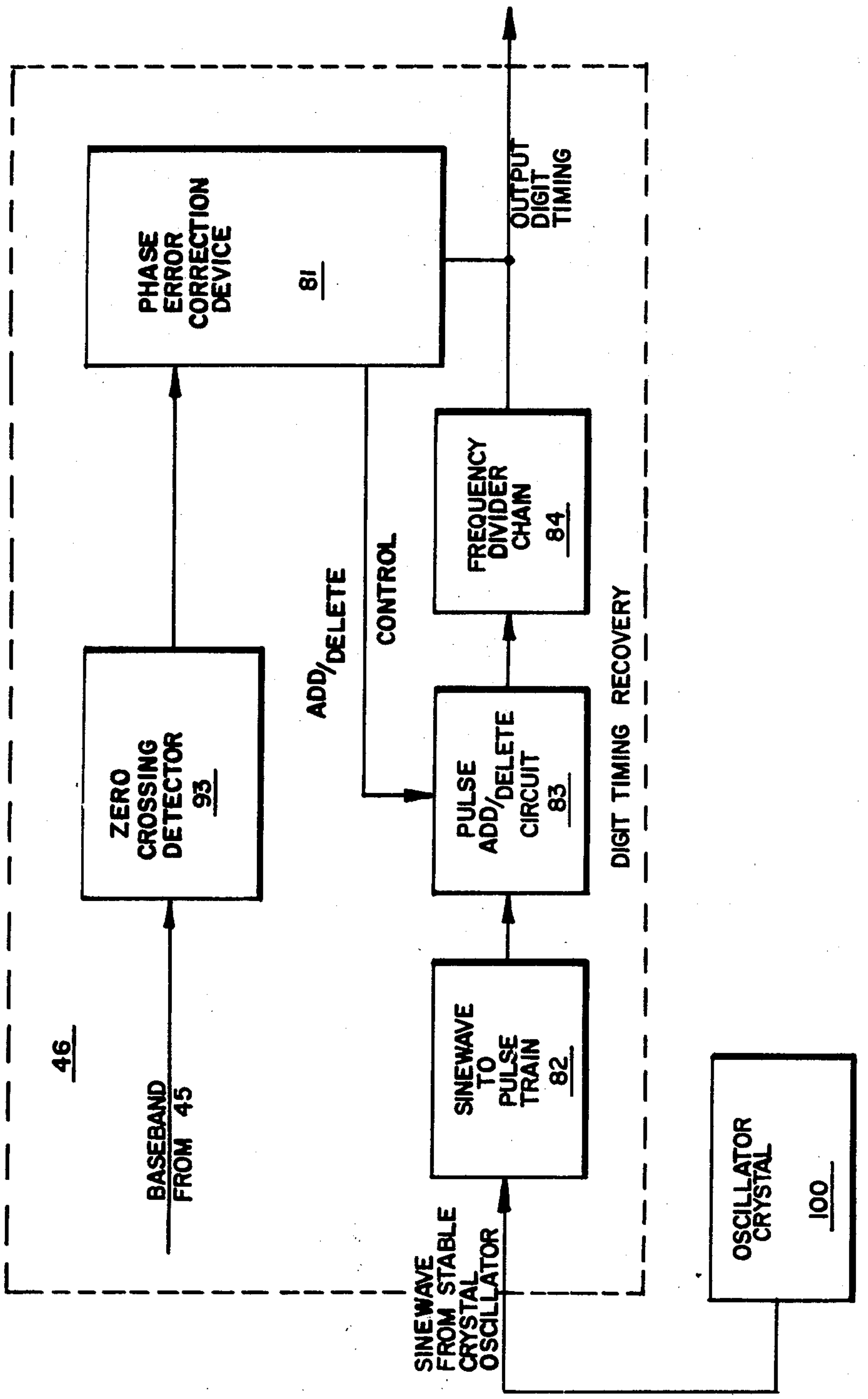
FIG. 13 illustrates in block diagram form the digit timing recovery device used in the receiver of FIG. 6.

Referring now to FIG. 13, within the digit timing recovery circuit 46 is a zero crossing detector 93 which generates a very narrow pulse at the time of each zero crossing of the signal from filter 45. The phase error correction device 81 compares the timing of each pulse from the zero crossing detector 93 with the timing of the nearest pulse from the frequency divider chain 84. Then, the phase error correction device causes the pulse add/delete circuit 83 to adjust the phase (or timing) of the digit timing pulse train by a small increment in the direction that makes this timing agree more closely with the timing of the latest zero crossing of the received baseband signal. The digit timing is adjusted by only a very small amount from each zero crossing of the baseband signal, not the full amount of the error indicated by this zero crossing. This feature causes the timing adjustment to be approximately averaged over a large number of zero crossings, which very nearly eliminates the "timing jitter" effects caused by noise, signal distortion (or intersymbol interference) and phase jitter on the channel. The size of the incremental adjustment of timing is determined by the pulse repetition rate of the pulse train entering the pulse add/delete circuit. This incremental adjustment size should be adjusted to obtain the best compromise between minimization of "time jitter" effects and speed of obtaining the initial timing adjustment. A good compromise for most purposes is to make this timing adjustment increment size approximately 0.002 times the baud duration. Then, in the arrangement shown in FIG. 13 the maximum time required to obtain the initial timing is approximately 250 to 300 baud intervals, since the maximum initial timing error is ±½ baud, the timing is adjusted by 0.002 baud duration during each baud interval and only a small percentage of the incremental adjustments are ordinarily in the wrong direction because of transmission disturbances. With these numbers, the frequency divider chain 84 should divide the frequency by a number N equal to approximately 500 and the stable clock frequency from crystal oscillator 100 should be N times the baud rate.

One important method of visualizing the combined operation of the transversal equalizer 47 and decision feedback 72 is as follows: At the time of each digit decision, several samples of the received signal are available at the taps of the delay line 50 in the transversal equalizer 47 so the receiver can utilize several signal samples (from several digit durations) in making each digit decision. The decision feedback 72 essentially compensates all of these samples for all of the intersymbol interference caused by previously evaluated digits. Then, the remainder of the transversal equalizer applies the optimum linear operation to the corrected signal samples. This can be shown mathematically as follows. The samples of the received signals at the input of the transversal equalizer 47 are:

$$x_i = \ldots + h_{-2}d_{i+2} + h_{-1}d_{i+1} + h_o d_i + h_1 d_{i-1} + h_2 d_{i-2} + \ldots x_{i+1} + \ldots + h_{-2}d_{i+3} + h_{-1}d_{i+2} + h_o d_{i+1} + h_1 d_i + h_2 d_{i-1} + \ldots \text{ etc.}$$

where the $h$'s are samples of the system pulse response at the input of the transversal equalizer. When the receiver is evaluating the digit $d_i$, it has already evaluated the preceding digits $d_{i-1}$, $d_{i-1}$, $d_{i-3}$, etc. Therefore, the decision feedback signal is adjusted to remove from the above equations, all of the terms involving these previously evaluated digits, terms which constitute intersymbol interference. Then, the signal samples become $$x'_{i-1} = \ldots + h_{-2}d_{i+1} + h_{-1}d_i$$
$$x'_i = \ldots + h_{-2}d_{i+2} + h_{-1}d_{i+1} + h_o d_i$$
$$x'_{i+1} = \ldots + h_{-2}d_{i+3} + h_{-1}d_{i+2} + h_o d_{i+1} + h_1 d_i$$

Now the transversal equalizer gain factors, $g$'s, together with the summer amplifier 53, apply the following linear operation to these signal samples to obtain the signal $y'_i$ from which the digit decision is made.

$$y'_i = \Sigma_k g_k X'_{i-k}$$

With unconstrained adjustments, $g$'s, this is an unconstrained linear operation on the received signal samples from which the decision feedback has removed most of the intersymbol interference. Therefore, if we select optimum gain adjustments, $g$'s, we implement the optimum linear operation on these signal samples. Actually, in the embodiment of FIG. 6 the signal has not been sampled at the input of the transversal equalizer; but, the operation can be analyzed in terms of samples of this signal, with sampling occurring at the baud rate. The arrangement contrasts with previous decision feedback receivers discussed in the Background of the Invention in which the receiver based its decision on the first significant sample of the system pulse response and cancelled out the succeeding samples so that earlier responses were prevented from interfering with succeeding decisions. At high data rates or under strong distortion the previous decision feedback devices wasted most of the signal power and caused a strong tendency toward long bursts of digit errors.

Figure 14:
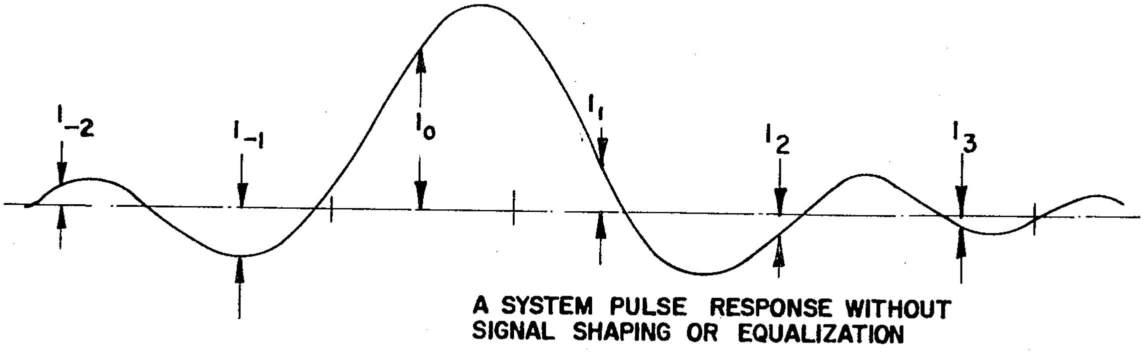
FIG. 14 illustrates a system pulse response without signal shaping equalization or decision feedback.

Referring to FIG. 14, the waveshape shown corresponds to a system pulse response without signal shaping or equalization. One sample occurs for each baud duration with the amplitude at each sample designated $l_n$. Within fairly wide limits, the decision feedback circuit can correct the trailing part of the system response to a single digit to prevent it from interfering with succeeding decisions because, as a single digit $d_n$ travels down a shift register, it generates a feedback signal $d_n (l_1+l_2+l_3+\ldots)$, which represents the trailing part of the single-digit (or pulse) response. This signal can be used to cancel out the trailing part of the system response. As a result, the signal shaper and the transversal equalizer can be concentrated on optimizing the leading part of the system pulse response.

Figure 15:
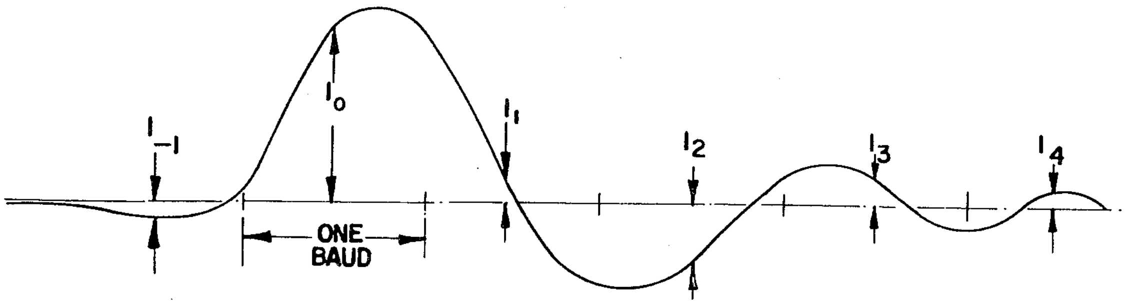
FIG. 15 illustrates a system pulse response with signal shaping and equalization.

In FIG. 15 the leading part of the system pulse response is reduced by adjusting the signal shaper and transversal equalizer so as to reduce the samples $l_{-1}$, $l_{-2}$ and $l_{-3}$ etc., while keeping $l_o$ large. The decision feedback 72 then removes the effects of the "trailing transients," $l_1$, $l_2$, $l_3$, $l_4$ etc. This fact makes it possible to signal under more severe conditions, or at higher ratios of symbol rate to bandwidth, than is possible without the decision feedback. Without the decision feedback, linear devices, such as the transversal equalizer and signal shaper, are required to correct the entire pulse response of the system; and, under severe distortion at exceptionally high data rates for given bandwidth, linear devices cannot accomplish this. The adjustments on both the signal shaper and the transversal equalizer are set to values that are specially selected for use in conjunction with the decision feedback.

The description so far has been directed to a system for handling binary digits. In many applications multilevel transmission is used. Multilevel (nonbinary) transmission allows more information to be transmitted with fewer digits. The system previously described is applicable to the multilevel operation except for the signal shaper, decision feedback device, and the decision device.

Binary-to-multilevel encoding can be accomplished by assigning a particular polarity and amplitude level to binary bits. For example, the following illustrates code conversions from binary to four- and eight-level codes:

| Binary | 4-Level |
|---|---|
| −− | −3 |
| −+ | −1 |
| +− | +1 |
| ++ | +3 |

| Binary | 8-Level |
|---|---|
| −−− | −7 |
| −−+ | −5 |
| −+− | −3 |
| −++ | −1 |
| +−− | 1 |
| +−+ | 3 |
| ++− | 5 |
| +++ | 7 |

The amplitude levels, −7 to 7 assigned to the eight-level conversion, and −3to 3, assigned to the four-level conversion are relative only and are proportional to the signal voltage levels used to represent these digits.

Figure 16:
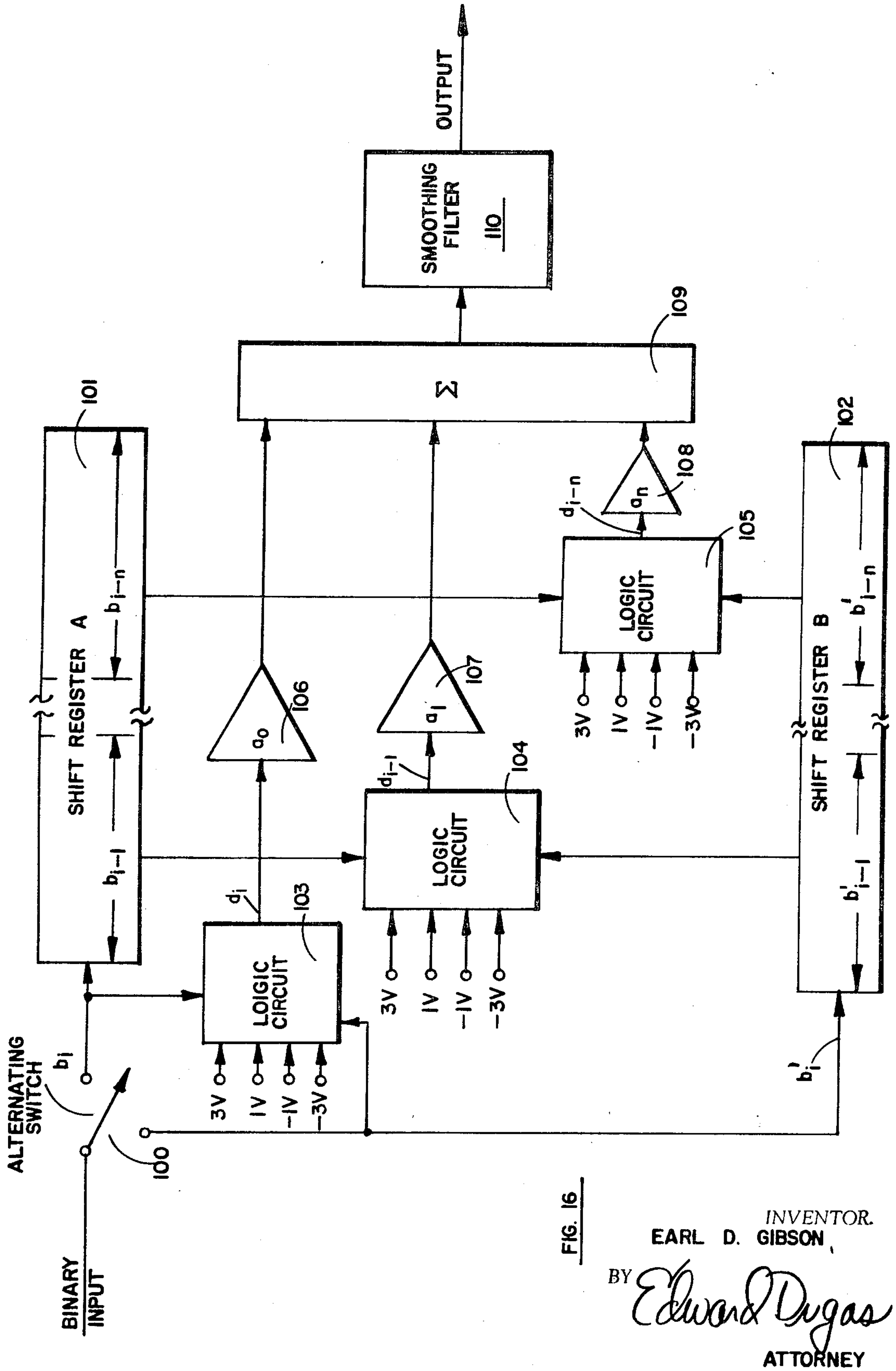
FIG. 16 illustrates in block diagram form a multilevel signal shaper for use in the transmitter embodiment of FIG. 1.

FIG. 16 illustrates in block circuit form a signal shaper for use with quaternary (four-level) transmission. With this signal shaper, no separate binary-to-quaternary code converter is required. Binary data enters the signal shaper in a serial stream at a fixed rate. Let the bits of this stream be grouped into pairs in which $b_i$ is the most significant bit of the $i^{th}$ pair and $b'_i$ is the least significant bit of the $i^{th}$ pair. The two bits of the $i^{th}$ pair will be represented by the $i^{th}$ quaternary digit, $d_i$.

The alternating switch 100 routes the most significant bit of every pair to shift register 101 and routes the least significant bit of every pair to shift register 102.

The preceding bits travel down the shift register and each pair is fed to a logic circuit 103, 104 and 105. Each pair of bits controls the associated logic circuit, which converts this bit pair to the associated quaternary digit. This is accomplished by connecting the output of the logic circuit to the proper reference voltage, which is +3V, +V, −V, or −3V (see the binary-to-quaternary conversion table above). An adjustable amplifier 106, 107 and 108 then multiplies the quaternary digit value $d_{i-j}$ by a gain factor, $a_j$. The outputs of the adjustable amplifiers are then summed in summer 109 to obtain the signal at the output to the smoothing filter 110. The $i^{th}$ sample of this signal is $$s_i = a_o d_i + a_1 d_{i-1} + a_2 d_{i-2} + a_3 d_{i-3} + \ldots + a_n d_{i-n} = \sum_{j=0}^{n} a_j d_{i-j}$$

where *a's are gain factors selected to give the desired signal shaping for a particular application and the* $d$'s are the quaternary digits. The $a$'s can be visualized as samples of the signal shaper pulse response, with the sampling rate equal to the quaternary digit rate. The $a$'s can thus be selected to give any pulse response desired in a particular application.

The output of the summation junction then passes through the smoothing filter 110. Filter 110 is identical to filter 24 in FIG. 2*a*. The output of the signal shaper is then fed to modulator 13 of FIG. 1.

The number of stages required in each shift register depends upon the accuracy of signal shaping required, which depends upon the application. For our purposes the number of stages in each shift register is approximately 10 to 16.

The multilevel decision device can be a simple analog-to-digital converter. For most applications only two- , three-, or four-bit analog-to-digital conversion is required. When the number of signal levels used for transmission is $2^n$, which is commonly the case, each transmitted digit represents *n* binary digits; and, the decision device is essentially an *n*-bit analog-to-digital converter.

Figure 17:
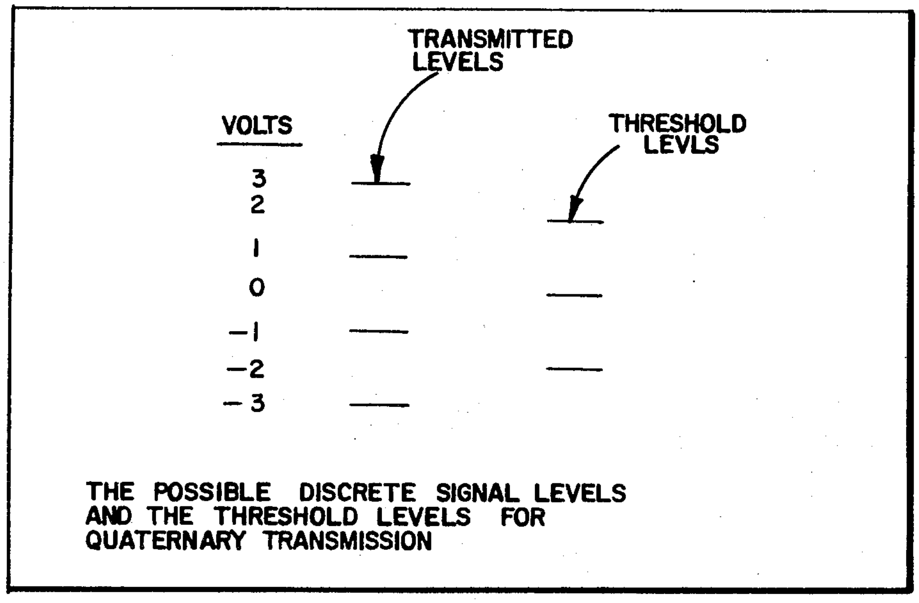
FIG. 17 illustrates signal levels useful in understanding the operation of the multilevel system.

As an example, FIG. 17 shows the signal levels involved in quaternary (four-level) transmission in which each transmitted digit represents two binary digits. The levels shown are relative, not absolute.

The signal transmitted for each digit has one of the following four possible values: ±1, ±3. Ideally, in the absence of noise and intersymbol interference, the signal at the input of the decision device has one of these four relative amplitudes. The decision threshold levels are set midway between the discrete signal levels, as shown by FIG. 17 and the following table:

| Binary Code | Quaternary Code | Signal Relative to Threshold Levels |
|---|---|---|
| − − | −3 | Below lower level, −2 |
| − + | −1 | Between zero and lower level |
| + − | 1 | Between zero and upper level, +2 |
| + + | 3 | Above upper level |

Figure 18:
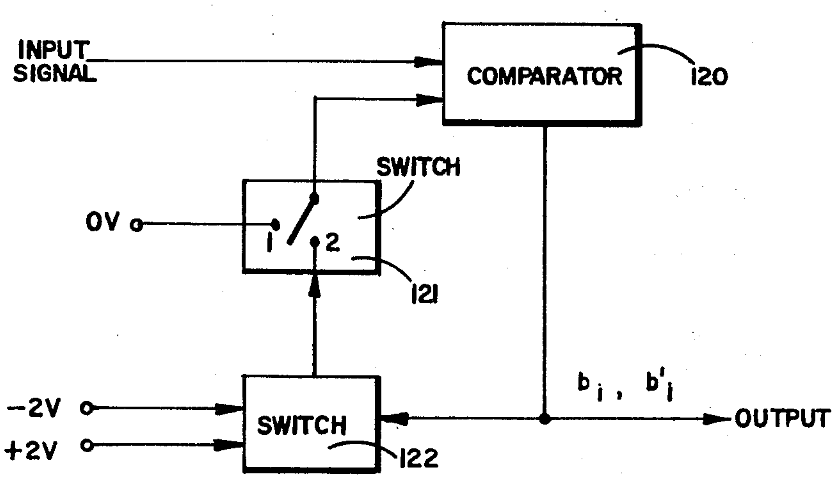
FIG. 18 illustrates a multilevel decision device for use in the receiver of FIG. 6.

Although a conventional type of analog-to-digital converter can be used for the multilevel decision device, FIG. 18 shows one arrangement for this device combined with four-level to binary decoding. The input signal to the decision device enters a comparator 120. Initially, switch 121 is in position 1, so the comparator compares the input signal voltage with zero voltage to determine whether the input is positive or negative. If the input signal is positive the comparator emits a binary "one" for the first (and most significant) bit, $b_i$, of the pair represented by the four-level digit, $d_i$. Otherwise, the comparator emits a −1 (or a zero) for $b_i$.

The bit $b_i$, in addition to being an output, controls switch 122. If $b_i$ is +1, switch 122 connects to a relative voltage of −2V, whereas, if $b_i$ is −1, switch 122 connects to a relative voltage of −2V. Note from FIG. 17 that +2V and −2V are threshold voltage levels. Meanwhile, switch 121 switches to position 2 to connect switch 122 to the comparator 120. The comparator 120 then compares the input signal level with the proper threshold level, +2 or −2, to determine the value of the least significant bit, $b_i$, of the pair of bits represented by the four-level digit $d_i$. The two binary digits $b_i$ and $b'_i$ thus appear in sequence on the output.

Figure 19:
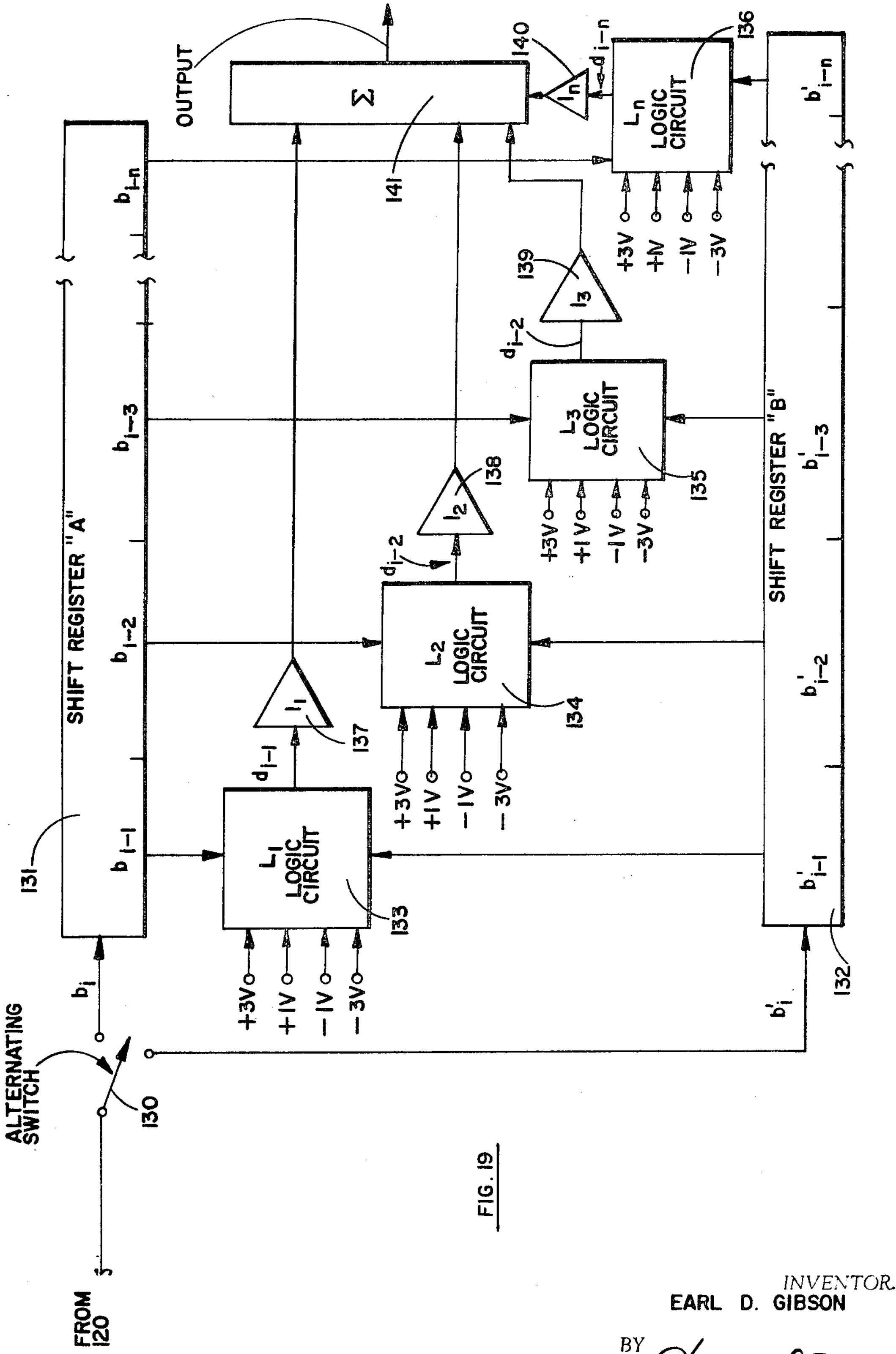
FIG. 19 illustrates in block diagram form a multilevel decision feedback device for use in the receiver of FIG. 6.

FIG. 19 illustrates in circuit block diagram form a quaternary decision feedback device which is substituted for the decision feedback device 72 of FIG. 6 for multilevel operation. This device is quite similar to the signal shaper with only one sample per digit. As explained above, the decision device converts each received quaternary digit, $d_i$, to two binary digits, $b_i$ and $b'_i$, which appear sequentially at the alternating switch 130. The alternating switch 130 feeds $b_i$ into shift register 131 and $b'_i$ into shift register 132. The previously evaluated bits travel along these shift registers; and, each pair is fed to a logic circuit 133, 134, 135 and 136.

Each logic circuit converts a pair of binary digits back to the quaternary digit. Amplifiers 137, 138, 139, and 140 or multipliers multiply each quaternary digit, $d_{i-j}$, by a given factor, $l_j$, which is a sample of the overall transmission system response to a single quaternary digit (ordinarily the pulse response). The outputs of the amplifiers are summed in summer 141 to obtain the decision feedback signal, which is fed to summer 48.

During the $i^{th}$ received digit interval, this decision feedback signal is:

$$f_i = l_1 d_{i-1} + l_2 d_{i-2} + l_3 d_{i-3} + \ldots + l_n d_{i-n}$$
$$= \sum_{j=1}^{n} l_j d_{i-j}$$

A comparison of this equation with FIG. 19 indicates how the equipment of FIG. 19 implements this equation to generate the desired decision feedback signal. This signal is subtracted from the transversal equalizer output to eliminate the intersymbol interference caused by previously evaluated digits.

The extension of the techniques described above to other numbers of signal levels (other radices) is straightforward. Also, extension of the signal shaping to various numbers of samples (or gain factors) per digit is straightforward. The use of more than one sample per digit in the decision feedback is not required in any ordinary application.

While it has been shown what are considered to be the preferred embodiments of the invention, it would be manifest that many changes and modifications may be made therein without departing from the essential spirit of the invention. It is intended, therefore, in the annexed claims, to show all such changes and modifications which fall within the true scope of the invention.

I claim:

1. An apparatus for data communication in the presence of intersymbol interference, noise and other transmission disturbances, said apparatus comprising, in combination:
   - a transmitter means for transforming a bit of digital data into a modulated analog signal and for transmitting said signal over a transmission channel with the interval between the transmission of digital data bits being the data rate;
   - a receiver means for receiving said analog signal, said receiver means comprised of:
   - a. demodulating means for demodulating said modulated analog signal;
   - b. a transversal equalizer for receiving said demodulated signal for providing a first coordinated signal at its output;
   - c. a summing means for receiving as one input said first coordinated signal;
   - d. means for sampling the output signal from said summer means at the data rate to provide pulse signals proportional to said output signal;
   - e. decision means for receiving said provided pulse signals and for converting said pulse signals into binary output signals representative of said pulse signals; and
   - f. decision feedback means receiving said binary output signals from said decision means and operating upon said binary output signals to provide a second coordinated signal which is fed to said summer means as a second input and subtracted from said first coordinated signal so as to effectively cancel interference.

2. The invention according to claim 1 wherein said transmitter means is comprised of:
   - signal shaping means for shaping a digital input signal into a first analog signal;
   - quadrature signal shaping means for shaping the digital input signal into a second analog signal shifted in phase from said first analog signal; means for modulating said first and second analog signal; and
   - means for summing said modulated signals together.

3. The invention according to claim 2 wherein said signal shaping means comprises in combination:
   - a multistage binary shift register for receiving the storing said bits of digital data;
   - polarity switch means at the output of each stage of said shift register;
   - adjustable attenuators attached to each of said switch means to control the amplitude of the signals from each stage of said shift register;

summer means summing the signals from said adjustable attenuators so as to provide a composite signal; and
filter means for smoothing said composite signal.

4. The invention according to claim 2 wherein said signal shaping means comprises in combination:
a multistage shift register for receiving and storing said bits of digital data;
a pair of polarity switch means connected to the output of each stage of said shift register;
a plurality of weighting resistors, one each connected to the output of each polarity switch means to individually fix the amplitude of the signals from each stage of said shift register;
a first and second summer means, each of said weighting resistors connected to one of said pair of polarity switch means connected to said first summer means, the other of said weighting resistors connected to other of said pairs of switch means connected to the inputs of said summer means:
multiplexing switch means receiving as inputs the output signals from said first and second summer means, said multiplexing switch alternately passing the output signals to the output of said multiplexing switch means; and
filter means for smoothing the output signal from said multiplexing switch means into an analog signal.

5. The invention according to claim 2 wherein said means for modulating said first and second analog signal is comprised of:
a first and second modulator means receiving said first and second analog signal respectively;
a modulating carrier signal source for providing a carrier signal to said first modulator means;
a phase shifting means for receiving the carrier signal from said signal source and for shifting the phase of said carrier signal, said phase shifting means connecting said carrier source to said second modulator means;
inverting means for inverting the signal from said second modulator means; and
summer means for summing the signal from said first and second modulator means with the carrier signal.

6. The invention according to claim 1 wherein said receiver means further comprises:
a carrier recovery means for receiving and recovering the carrier portion of the received analog signal and for feeding said recovered signal to said demodulator.

7. The invention according to claim 6 wherein said carrier recovery means is comprised of:
a phase lock means receiving the carrier portion of the received signal and for tracking the received carrier signal in the presence of noise and phase jitter; and for providing a signal indicative of the carrier signal;
phase offset correction means for receiving said signal indicative of the carrier portion of the received analog signal and for correcting the phase of said signal to match the phase of the received data signal.

8. The invention according to claim 7 wherein said phase offset correction means is comprised of:
a phase modulator means connected to the output of said phase lock means for advancing or retarding the carrier phase in response to a control signal, the output of said phase modulator being fed to said demodulating means;
a phase retard means for receiving the output signal from said phase modulator means for retarding the phase of said received signal by a fixed amount;
a second demodulator means for receiving said modulated analog signal from said transmitter and said phase retarded carrier signal from said phase retard means, to demodulate said received signal at the retarded carrier rate; and
difference determining means receiving the demodulated signals from said first and second demodulators and providing a control signal to said phase modulator which control signal is indicative of the difference therebetween so as to vary the output of said phase modulator means to minimize the difference.

9. The invention according to claim 1 wherein said decision feedback means is comprised of:
a multistage binary shift register for receiving and storing said binary output signals from said decision means;
adjustable gain means connected to the output of each stage of said shift register for adjusting the amplitude of the signals from each stage to correspond to the amplitude of a selected sample of the system pulse response as seen at the output from the transversal equalizer without the decision feedback means connected in circuit; and
a second summer means, summing the output signals from each adjustable gain means and feeding said summed signal to said first-named summer means.

10. The invention according to claim 2 wherein said signal shaping means is a multilevel signal shaping means for shaping a multilevel digital input signal into an analog signal, said multilevel shaping means comprised of:
a first and second multistage binary shift register;
an alternating switch means routing one bit of every pair of input bits to said first multistage binary shift register and the other bit of each pair of input bits to said second multistage binary shift register;
a first logic means connected to the input of said first multistage binary shift register to provide an output signal indicative of the multilevel digit value of said digital input signal;
a summer means;
a first adjustable gain means receiving the output signal from said first logic means and connecting said output to said summer means;
a plurality of logic means, each connected to receive the outputs from one stage of said first and said second multistage binary shift register, said means providing an output signal indicative of the level of the signals received from said stages;
a plurality of adjustable gain means, one each connected to output of a logic means for controlling the amplification of the signal from said logic means and for feeding said signal to said summer means; and
filtering means for smoothing the output signal from said summer means.

11. The invention according to claim 10 wherein said decision feedback means is a multilevel decision feedback means comprised of:
a third and fourth multistage binary shift register;
an alternating switch means routing every significant bit of a digital input signal to said third multistage binary shift register and each least significant bit of digital input signal to said fourth multistage binary shift register;
a plurality of logic means, each connected to a corresponding stage of said third and fourth multistage binary shift register to provide an output signal indicative of signals from said stages;
a summer means;
a plurality of adjustable gain means, one each connected to a one of said logic for controlling the amplification of the signal from said logic means and for feeding said signal to said summer means;
filtering means for smoothing the output signal from said summer means.

12. A communication system comprising in combination:
means for transforming a bit of digital data into a modulated carrier analog signal and for transmitting said signal over a conductive transmission line; and
means for receiving said signal comprising:
means for recovering the carrier signal from said received signal;
demodulator means having as an input said received signal and utilizing the carrier signal from said recovery means for demodulating said received signal;
filtering means for filtering the high-frequency components from said demodulated signal;

a transversal equalizer means receiving said filtered signal and for providing an equalized signal at its output;

summer means connected to receive as one of its inputs said equalized signal;

sampling means for periodically sampling the output of said summing means and for providing a sampled signal indicative of the amplitude and polarity of the signal from said summer means at the sample time;

decision means for examining the signal from said sampler to determine the value of the transmitted digit and for providing a system output indicative thereof;

a decision feedback means receiving said system output signal and feeding said signal back to said summer means to be subtracted from the signal from said transversal equalizer so as to subtract away substantially all error components from said received signal.

* * * * *